United States Patent
Bleyle

[15] 3,682,224

[45] Aug. 8, 1972

[54] SCALE PREVENTION AGENTS OF METHACRYLIC ACID-VINYL SULFONATE COPOLYMERS FOR SALINE WATER EVAPORATION

[72] Inventor: Merrill Bleyle, 113 Temple Road, Waltham, Mass.

[22] Filed: Dec. 17, 1970

[21] Appl. No.: 99,306

[52] U.S. Cl. ............... 159/47 R, 159/DIG. 13, 203/7, 203/57, 210/58, 252/180, 260/79.3 M
[51] Int. Cl. .............................................. B01d 3/34
[58] Field of Search........ 203/7, 10, 57; 159/DIG. 13, 159/47; 210/58; 252/180; 260/79.3 M, 79.3 MU

[56] References Cited

UNITED STATES PATENTS

| | | | |
|---|---|---|---|
| 3,578,589 | 5/1971 | Hwa et al. | 210/58 |
| 3,516,910 | 6/1970 | Engman et al. | 203/7 |
| 3,260,668 | 7/1966 | McIlhenny | 203/7 |
| 3,444,054 | 5/1969 | Salutsky | 203/7 |

Primary Examiner—Wilbur L. Bascomb, Jr.
Attorney—Theodore C. Browne, C. F. Parker and Armand McMillan

[57] ABSTRACT

The temperature at which saline and sea-water evaporators can be operated is raised materially by adding from 1 – 10 parts of the copolymer of methacrylic acid and vinyl sulfonate, preferably in the form of a basic salt, to the saline water in the evaporator. At 10 PPM addition, the evaporators can be run at 280° F., and the water be allowed to concentrate ten-fold without the precipitation of calcium sulfate occuring on the evaporator surface. Monomer ratios of methacrylic acid to vinyl sulfonate may be varied from 50–50 to 25–75.

9 Claims, No Drawings

SCALE PREVENTION AGENTS OF METHACRYLIC ACID-VINYL SULFONATE COPOLYMERS FOR SALINE WATER EVAPORATION

This invention relates to addition agents which reduce the amount of scale deposited on vessels in which water is boiled or is distilled.

The concentration of saline water by evaporation is limited by the fact that as the water is heated, calcium carbonate, magnesium hydroxide, and calcium sulfate are thrown out of the solution.

For a very long time it has been recognized that if the water temperature could be raised beyond the present practical limit of about 250° F., distillation would become vastly more efficient, and the concentration of water in the boiler could safely be raised from its present limit of about one to two. It has been known that the addition of certain substances to the boiling solution in considerable degree prevents the formation of the carbonate and the magnesium scales. But if sea water, e.g., is concentrated at temperatures above 185° F., calcium sulfate also is precipitated, and known agents prevent the formation of calcium sulfate scale ineffectively.

Among the agents which are known to prevent scales containing carbonate and magnesium hydroxide are sodium polyphosphates. Varying proportions of other compounds such as lignin sulfonic acid derivatives and numerous esters of alkaline glycols are also added. These, in addition to the primary action of polyphosphates, aid in various ways by sequestering ions, dispersing scale formers, and inhibiting the formation of foam.

The effect of the polyphosphates stops at 195° F. because at this temperature polyphosphates rapidly hydrolize and form a sticky orthophosphate which deposits at a higher temperature.

It is also a practice to add continuously to the saline liquid in the distilling vessel, from 100–120 ppm of sulfuric acid. This removes the alkalinity due to bicarbonate and carbonate present in natural sea water. After such treatment, calcium carbonate and magnesium hydroxide scales do not form. Even with $H_2SO_4$ addition, temperatures must not exceed 250° F., for at this temperature the formation of scales of calcium sulfate occurs very rapidly.

The problem becomes very difficult on ships, because on shipboard sulfuric acid is not allowed. As a result, ship evaporators are limited to an evaporation temperature of 195° F.

A considerable improvement is achieved by the use of 1-3 ppm of polymethacrylic acid (U.S. Pat. No. 3,444,054 to Murrell Salutsky), but although the polymethacrylic acid, and particularly its sodium salt, greatly reduce the precipitation of the alkaline scaling, scaling due to the formation of calcium sulfate is not controlled with comparable efficiency. And again, even with the use of polymethacrylic compounds, the permissible concentration of water and the temperature must be limited.

I have found that if a copolymer is made from methacrylic acid and vinyl sulfonate, and used in the form of its alkali metal salt, or used as salts formed from basic nitrogenous compounds, much higher temperatures can be used without the throwing down of a calcium sulfate scale. In addition, the metal of the heat exchanger remains bright, unpitted, and exhibits only an exceedingly thin film after long-time immersion in boiling sea water.

The copolymer which is acid, forms a soluble salt when reacted with alkali metal hydroxides and is useful in the pH ranges of approximately $pH_7$–$pH_8$. In addition to the alkali metals, basic nitrogenous compounds are also effective and include ammonia and alkyl substituted amines having a pK value of about 5 or lower. The class of operative compounds includes primary, secondary, and tertiary alkyl amines and polyamines, e.g., ethyl amine, triethylamine, methyldiethylamine, diethylbenzylamine, and others. Compounds which include oxygen and other substituents which are "active," e.g., triethanolamine and morpholine are excluded.

In adapting the copolymer to use as a scale preventative in boilers or evaporators used in the desalination of water, the alkali metal hydroxides or the basic nitrogenous compounds are added to the copolymer until titration shows that the pH of the solution has reached neutrality, and preferably lies between $pH_7$ and $pH_8$.

EXAMPLE I

The copolymer of methacrylic acid and vinyl sulfonate was made by adding 100 parts by weight of methacrylic acid, 100 parts by weight of vinyl sulfonate to 600 parts by weight of water in a polymerization reactor. The promotor used was potassium persulfate. The charge was heated between 170° F. and reflux temperature for a period of about 3 hours. The product was converted to the water soluble sodium salt by adding sodium hydroxide.

EXAMPLE II

Twenty-five parts of methacrylic acid and 75 parts of vinyl sulfonate were added to 600 parts by weight of water in a polymerization reactor. The charge was promoted by potassium persulfate and polymerized under the conditions recited in Example I. The polymer product was converted to the ammonium salt by adding 28 percent ammonia to the solution until the potentiometric reading was 7.3.

EXAMPLE III

A 50/50 methacrylic acid-vinyl sulfonate copolymer was made according to the procedure of Example I. Following polymerization, ethylamine was added to the solution containing the polymer until the pH of the solution registered slightly in excess of 7.

EXAMPLE IV

A copolymer was made following the procedure of Example I with the exception that the mutual proportions of methacrylic acid to vinyl sulfonate were 75/25. Following polymerization, the polymer solution was neutralized with triethylamine, neutrality being determined by a pH meter.

All of the above polymer salts showed high antiscaling activity which was determined as follows: the efficiency of these compositions as antiscaling additives to saline water was tested by boiling varying proportions of each of the copolymer salts in seat water obtained off shore near Rockport, Mass. The composition of the sea water was tested for: (1) alkalinity, and (2) ethylenediaminetetra-acetic acid hardness (EDTA). The test for alkalinity measures the carbonate, bicarbonate and hydroxide components of the sea water. The test for EDTA hardness measures the total concentration of calcium and magnesium ions expressed as miligrams $CaCO_3/l$. The difference between the alkalinity hardness and the EDTA hardness measures the known carbonate hardness of the sea water. The following values were found: EDTA hardness, 730 $m_g$ $CaCO_3$/lb; alkalinity, 122 $m_g/l$; non-carbonate hardness, 608 $m_g/l$.

The apparatus used to evaluate the antiscaling activity of the copolymer comprised a stainless steel ball flask and stainless steel condensing equipment to withstand the pressures involved. This was provided with two electric heater rods clad with "304" stainless steel. The flask was charged with 2,000 ml of sea water at the beginning of each run, and boiling by heat derived from the heater rods, which operated at a surface temperature of 280° F., was continued until the volume of sea water had been reduced to 300 ml. At this time the heaters were withdrawn from the flask. They were carefully examined for scale and for any indication of erosion or surface pitting of the cladding. The interior of the flask was examined for scale deposit, and afterwards and before each run, was thoroughly rinsed.

Each of the copolymer salts was tested in this manner, and each salt was used in varying proportions, ranging from 1–10 ppm of sea water. All the copolymers were found to have a useful antiscaling action at a concentration of 5 ppm with the 25/75 methacrylic/vinyl sulfonate copolymer showing effective scale reduction in the concentration of 3 ppm. The estimated economic upper limit of copolymer salt to sea water is approximately 10 ppm. Boiling tests in which the concentration of copolymer salt to sea water range from 10–20 ppm were made, but very little advantage in additions above 10 ppm was noted for any polymer salt.

Beginning with a concentration of 3 ppm, a very slight film appeared on the stainless steel surfaces at the end of the evaporation run. As the concentration increased to 10 ppm, the bright polished stainless steel surfaces were covered by a very slight haze. There was no buildup of scale and no attack or modification of the stainless steel surface could be seen. The most outstanding effect, when additions were made at the recommended concentrations, was the ability to concentrate the sea water much more than is possible in present evaporator practice. Instead of the common ratio of 1–2 in boiling down, 65–70 percent of the water initially charged into the evaporator was boiled off with no scale appearing.

It appears to make very little difference how the copolymer is introduced into the water in the evaporator. The usual method of maintaining a constant concentration in the feed water is simple and effective, but the polymer may be added in a preliminary water heating zone. It can be introduced into the evaporator vaporization zone, or it may be added to the recycle stream. Tests in laboratory evaporators simulating the conditions encountered on shipboard showed insignificant differences among the various methods by which the polymer was introduced into the boiling zone. In all cases 65–70 percent concentration at temperatures of approximately 280° F. produced no scaling.

I claim:

1. The process of evaporating saline water comprising maintaining a concentration of from 3–20 ppm of scale-inhibiting agent consisting essentially of a water soluble salt of a copolymer of methacrylic acid and vinyl sulfonate, the salt-forming moiety of the compound being selected from the class of alkaline compounds which consists of alkali metal hydroxides, ammonia, and alkyl substituted amines having a pK value up to and including 5.

2. The process of claim 1 wherein the scale-inhibiting agent is the ammonium salt of the said copolymer.

3. The process of claim 1 wherein the scale-inhibiting agent is the triethylamine salt of the said copolymer.

4. The process of claim 1 wherein the scale-inhibiting agent is the sodium salt of the said copolymer, and wherein the pH of the solution of the said salt in water lies between $pH_7$ and $pH_8$.

5. The process of claim 1 wherein the monomeric ratios of methacrylic acid and vinyl sulfonate lie in a range between 75 parts of methacrylic acid to 25 parts of vinyl sulfonate, to 25 parts of methacrylic acid to 75 parts of vinyl sulfonate.

6. The process of claim 1 wherein the copolymer moiety of the scale-inhibiting agent is the 50/50 copolymer of methacrylic acid and vinyl sulfonate.

7. The process of claim 1 wherein the said copolymer salt is added to the feed water of the evaporator.

8. The process of claim 1 wherein the saline water is sea water.

9. The process of claim 8 wherein the sea water is evaporated at temperatures up to 280° F.

* * * * *